April 16, 1957     J. B. CRYSLER ET AL     2,788,941
MULTI-ZONE CONTROL APPARATUS
Filed Nov. 3, 1954
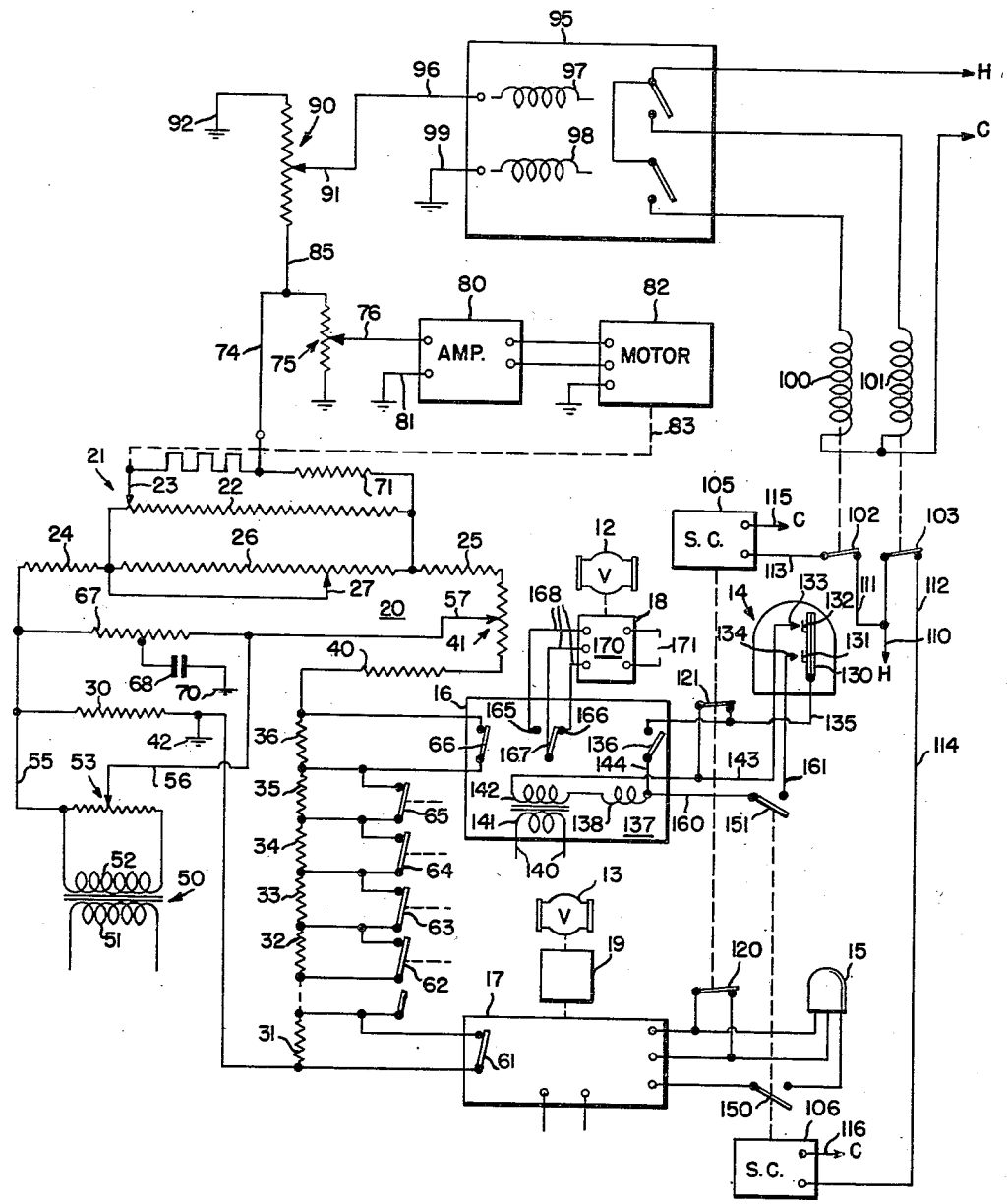
INVENTORS
JOHN B. CRYSLER
GENE T. GADDIS
ERLING C. HALLANGER
BY *George H. Fisher*
ATTORNEY United States Patent Office 2,788,941
Patented Apr. 16, 1957

2,788,941

MULTI-ZONE CONTROL APPARATUS

John B. Crysler, Glen Rock, N. J., and Gene T. Gaddis, Minneapolis, and Erling C. Hallanger, St. Paul, Minn., assignors to Minneapolis-Honeywell Regulator Company, Minneapolis, Minn., a corporation of Delaware Application November 3, 1954, Serial No. 466,624

10 Claims. (Cl. 236—1)

Our invention relates to a multi-zone control apparatus and more particularly to a supervisory control for a multiple zone temperature control apparatus.

In large heating and/or cooling installations, the heating and cooling requirements and the temperature of the of the various parts thereof varies throughout the installation and consequently effective and uniform temperature control is provided by utilizing individual temperature controllers for the various zones making up the installation to control the flow of a temperature conditioning media from a central source or generator. Such multiple zone control is currently being used. Where the number of zones are small, the temperature controllers for the zones may singly or together be utilized also to control in varying degrees the operation of the heating and cooling apparatus or generator supplying the temperature conditioning or changing media for the zones. In larger installations, the zone temperature controllers merely control the flow of the temperature changing media from a source depending upon the need for such media at the zone and without regard to the operation of the heating or cooling apparatus supplying the temperature changing media. In such installations the operation of the heating or cooling apparatus is controlled through independent automatic control or by manual operation such as by an attendant. An example of the former type of installation can be found in the Kriechbaum Patent 2,179,044 dated November 9, 1934, over which the subject application or invention is an improvement.

The problem arises in connection with the latter type of installations that the lack of interrelationship between the heating and/or cooling plant and the demand by the zones' operations to provide instability of the control system and places an undue strain on the heating and cooling apparatus. In heating apparatus utilizing a large boiler, the problem of load stability is a critical one, both from the standpoint of performance and safety. In addition, control of rate at which the heating and/or cooling plant is loaded or unloaded provides for increased economy both in the initial cost of installation and in the operation and maintenance of the same.

The present invention provides an improved multiple zone control apparatus with a supervisory control which controls the rate at which zones are supplied and hence the load is varied. Further the apparatus includes a sequencing control which is connected to each of the zone controlling devices and which provides for operation of the zone controllers both to connect and disconnect the zones from the source of temperature changing media in a predetermined sequence while not disturbing to any great degree the normal operation of the individual zone controllers and associated temperature responsive devices.

It is therefore an object of our invention to provide an improved zone control apparatus.

Another object of our invention is to provide in a multiple zone control apparatus a means for limiting the rate of operation of the zone controllers to stabilize the load on the source of temperature changing media.

Still another object of our invention is to provide in a multiple zone control apparatus a supervisory control which sequences the operation of the zone controllers when they respond to a demand for operation.

It is also an object of this invention to provide an improved multiple zone control apparatus which operates as a safety device on the heating and/or cooling generator or apparatus for the system and provides stability in loading of the plant and improved and economical operation of the system.

These and other objects of the invention will become apparent from the reading of the attached description together with the drawing which shows a schematic disclosure of the control circuitry.

Our improved multiple zone control apparatus is shown in the drawing schematically as disclosing circuit components only without reference to a particular type of heating or cooling generator or installation. It is to be understood, however, that the apparatus is to be utilized primarily on an installation in which the heating or cooling generator is controlled separately from the zone control apparatus through either manual or automatic means and supplies a source of temperature changing media which is directed to the various zones and controlled through suitable means such as valves indicated schematically at 12 and 13. Our control circuitry is supplied to large installations having a large number of zones each with its separate temperature responsive device such as the thermostatic elements shown at 14 and 15 in the drawing and with associated zone controllers such as control apparatus 16 and 17 respectively as shown in the drawing for the individual zone control circuitry indicated. The particular zone control circuitry illustrated here is of the two position type employing Weatherstats or simulating thermostats which operate through a control panel to energize a motor such as is indicated at 18 and 19 which cooperate with the panel to control the operation of the valve and make up what is known as the temperature controllers or zone controllers indicated at 16 and 17. An example of this type of circuitry is disclosed in the Shivers Patent 2,170,310 dated August 22, 1939. It is to be assumed that the source of temperature changing media which is supplied to the zones is controlled by the valves or other suitable means the equivalent thereof to throttle or vary the flow of temperature changing media to the respective zones to condition the same. The valves operate in response to a demand for operation by the thermostat to open or close. It will be understood also that the thermostat element could be of the indoor or outdoor type. Since the control of the valves are not interrelated between the zones, there is a possibility of all of the zones or units calling for the same kind of operation at the same time and consequently placing an undue load on the heating or cooling generator supplying the temperature changing media to the zones.

In our invention, the operation of the zone valves is interrelated through a supervisory control apparatus to be hereinafter described. Our supervisory control includes a master bridge network indicated generally at 20 which includes a motor balance potentiometer 21 having a winding 22 and a wiper 23, the winding being connected at its extremities to resistors 24 and 25 to form two adjacent sides of the bridge. Connected in parallel with the winding 22 is a second resistor potentiometer 26 having a wiper 27 which is adjustable to vary the authority of the balance potentiometer in a conventional manner. The opposite sides of the bridge are formed in a resistor 30, a plurality of resistor elements 31—36 respectively, a resistor element 40, a calibration potentiometer 41 which are connected in parallel with the first named side of the bridge in the conventional manner. The output of the bridge appears across a wiper 23 of motor balance potentiometer 21 and a ground connection of 42 which is connected between the resistor 30 and the resistors 31—36 to define the output diagonals of the bridge. The bridge network 20 is energized from an alternating current source of power such as indicated by the transformer 50 whose primary 51 is connected to the alternating source and a secondary winding 52 which is connected to an adjustable potentiometer 53, to one extremity of the resistor 30 by a conductor 55 and by a conductor 56 to the wiper 57 of the calibration pot 41. As will be seen from the drawings, each of the resistors 31—36 have associated therewith contacts from the respective controlling apparatus 16 or 17, the contacts being numbered 61—66 respectively and operating to shunt out the resistor from the bridge. Although only six resistors are shown it will be readily understood that one such resistor is included in the bridge for each zone of the control system and each respective resistor is adapted to be shunted out or inserted in the bridge by operation of the zone control apparatus associated therewith, the resistors all being identical and operating when shunted out of the circuit or added to the circuit to unbalance the bridge network. In addition to the above, the bridge includes a second arm or branch parallel to the above named parts of the bridge and connected across the source of power, this arm including a very high ohmic value resistor indicated at 67 which is connected through the condenser indicated at 68 to a ground connection 70 to provide for a capacitive balance for the bridge network. Because of the high resistance value of the resistor 67, this branch circuitry has no effect on the normal operation of the bridge and is adjusted initially to balance out any capacitance due to long leads between the resistors connected to the zones or zone controllers in other various parts of the bridge to establish a null condition. Once adjusted this capacitive balance potentiometer is not operated further and has no further effect on the operation of the apparatus. In addition to the above, the wiper 23 of the motor balance potentiometer has a resistor 71 connected therewith which is tied to one extremity of the winding 22 to provide for modification of the ratio between motor balance pot wiper movement and the resistance output of the potentiometer.

The output circuit of network 20 is connected to the wiper 23 and a conductor 74 to a potentiometer 75 whose wiper 76 is connected to the input terminals of an amplifier indicated at 80 having a second input terminal grounded at 81 to complete the output circuit to the grounded connection 42 of the network. Amplifier 80 is shown in block form inasmuch as its details form no part of the invention but is merely an alternating current input type amplifier designed for reversible operation of a motor 82 associated therewith which is geared down to a relatively slow speed of operation and mechanically connected to the wiper 23 of the balance potentiometer 21 through a connection indicated at 83 to drive the same. Motor 82 can be of the alternating current or direct current type but must have a substantially constant speed characteristic and be capable through gearing to operate very slowly and uniformly the movement of the balance potentiometer wiper 23. Inasmuch as its details form no part of the subject invention it is also shown in block form.

Also connected to the output circuit of the amplifier 20 is a second or parallel output circuit which is connected by a conductor 85 to the conductor 74 and includes a potentiometer 90 having a wiper 91 and whose winding is grounded at 92 to complete an output circuit through the grounded connection 42 of the bridge network. This adjustable potentiometer has its wiper 91 connected to a second amplifier 95 shown in block form, the wiper 91 being connected to an input terminal of the amplifier through a connector 96 and the input circuit to the amplifier being completed through a grounded input terminal 97 to complete the input circuit to the amplifier through the grounded connection 92 of the adjustable potentiometer. Amplifier 95 is also conventional in form and its details are omitted here for simplicity consequently it is shown in block form. It should be of the type that receives an alternating current and is sensitive to phase reversal to operate a pair of relays indicated at 97 and 98 for the purpose of controlling a second pair of relays indicated at 100 and 101 for the purposes later to be defined. The amplifiers 80 and 95 are adjusted so that they have different threshold levels and the potentiometers 75 and 90 are so adjusted that the amplifier 80 will be energized upon any minute unbalance of the bridge while the amplifier 90 will take a large unbalance of the bridge for purposes to be later noted. The differential relay output of the amplifier 95 controls selectively the energization of one or the other of a pair of relays 100 and 101 whose contacts 102 and 103 respectively are connected in the energization circuit for a pair of step controllers indicated at 105 and 106.

The step controllers 105 and 106 are shown in block form and may be conventional A. C. motors of the constant speed type. They are energized from a source of power indicated at 110 which is connected by conductors 111 and 112 through the switches 102 and 103 respectively to conductors 113, 114 leading to the step controllers with the return circuit completed from the step controllers through conductors 115, 116 respectively to the opposite side of the source of power. Under normal operation, the relays 97, 98 of the amplifier 95 are deenergized and the contacts associated therewith are of the normally closed type being operated by energization of the relay to an open position. Thus the circuit is made upon the deenergization of one or the other of the relays 97, 98 to energize one or the other of the relays 100 and 101 depending upon the direction or phase of input to the amplifier 95 to break one or the other of the switches 102 and 103. With the opening of the switches 102 or 103 the respective step controller associated therewith will be deenergized. Associated with the step controller 105 are a plurality of switches two of which are indicated at 120 and 121 of the normally closed type which are momentarily opened whenever the step controller rotates through a given angular position. The step controller 105 will have as many normally closed contacts as there are zones in the system and each of the normally closed contacts will be sequentially positioned so that only one will be operated at a time and all of them will be operated at a predetermined sequence through a single revolution of the step controller with an equal timed opening for each of the switches. These momentarily opened switches of the step controller are connected each in parallel across the hold contacts of the thermostatic element.

In the drawing, only thermostatic element 14 is shown in detail but it will be understood that each of the thermostatic elements is comprised of a bimetal element such as is indicated at 130 of the thermostat element 14 having a pair of arms 131, 132 which cooperate with stationary contacts 133, 134. As indicated in the drawing the bimetal arm 130 is connected by a conductor 135 to contacts or switch 136 of a relay 137 having a coil 138. Relay contacts 136 are of the normally open type which are closed upon energization of the coil. The coil 138 is energized from a source of power indicated at 140 which is connected to the primary winding 141 of a transformer, a secondary winding 142 of which is connected at one extremity to the coil 138 and the other extremity through a conductor 143 of the stationary contact 133 of the thermostatic element 14. The other side of the coil 138 is connected by a conductor 144 to the opposite side of the switch 136. In addition to the switch connected in parallel across the thermostatic contacts 133, 132 the step controller 106 is provided with a plurality of normally open contacts, one for each zone which are momentarily closed and are operated at a predetermined sequence each being connected in series with a pair of the contacts of the thermostatic element. As shown in connection with the thermostatic element 14, the normally open contacts of the step controller 106 two of which are indicated at 150 and 151 in the drawings associated with thermostat elements 15 and 14 respectively are connected so that they are in series with the contacts 134, 133 and in series with the coil 138 as will be indicated by checking the drawing. The contact 151 is connected by a conductor 160 to the coil 138 and at its other extremity by a conductor 161 to the stationary contact member 134.

Relay 138 of the zone controller 16 also includes a pair of in and out contacts or open and close contacts formed stationary contact members 165, 166 cooperating with a movable contact member 167 which are connected through conductors 168 to a motor indicated in block form at 170, the motor having an energizing source indicated at 171 and mechanically connected to the valve to operate the same. In the deenergized position of the relay, the motor is connected to operate the valve toward a closed position and when the relay is energized that is the elements 165, 167 are engaged the motor will energize to open the valve to an open position. In addition to the above a third set of contacts indicated at 66 are included in relay 138. These contacts as previously described operating to remove the shunt from the associated resistor element indicating that the zone controller is calling for heat and the valve is open inserting the respective resistance into the bridge and unbalancing the bridge.

It will be understood that while not shown in the drawing that each of the valves employs the same circuitry together with the sequencing contacting connected in series and parallel respectively with contacts of the thermostat which is a two position device, the contacts 133, 132 making initially upon a call for heat but not providing any circuit until the contact 134 is made with the element 131 at which point the relay 138 is energized whenever step controller switch 151 makes to pull in making the contact 136 and establishing a holding circuit for the thermostat contacts. Thereafter the contacts 132, 133 may open but until the thermostat is positively satisfied and the bimetal element 130 is moved such as to break the contacts 131, 134 and contact 121 is opened, the holding circuit which is in series with the holding contacts 136 the holding circuit will remain established. Operation of the relay 137 operates to energize the motor in the manner described above and also to remove the shunt from the resistor in the supervisory bridge control. It will also be evident from the above description that the continuously operating step controllers which permit the opening and closing of the valves will be normally operated so that once every revolution or once every minute if the speed of operation is one revolution per minute the individual zone controller will be in a position to make or break its respective circuit.

Thus if the contact 151 is momentarily made and the thermostat element 14 is calling for heat and the relay is deenergized, a circuit will be provided through the contacts 131, 134, 132, 133 to permit energization of the relay 138 and operation of the controller. Inasmuch as the holding circuit is established which is in parallel with the momentarily closed switch the relay or controller will remain energized even though, the sequencing device continues to move past the position where the switch 151 is closed and thereby opened. Next consider the closing of the valve or deenergization of the relay assuming that the same has been energized when the step controller 106 is operated. When the step controller 106 is operating it will be seen that upon a satisfaction of the demand for operation of the controller the contacts of the thermostat element 14 may open that is the bimetal element may move to break the contacts 131, 134 and 132, 133. However the holding circuit will still be established through the momentarily open step controller contact 120 and as such the relay will remain energized even though the thermostatic element is satisfied and until the step controlled or sequencing device is moved to a position where the associated switch is momentarily opened thereby opening the circuit and deenergizing relay 138. Thus it will be seen that even in the opening or closing position of the thermostatic element it is also necessary as a condition that the step controller be in a condition to operate before the zone controller 16 will be operated to the desired position. It should be recognized that the operation of the step controller is at such speeds that the normal operation of the zone control apparatus will not be effected and that the zones assuming that all respond substantially at the same time to the same demand for temperature change will require that they be operated in the predetermined sequence of operation of the step controller switching.

Considering now the operation of our improved zone control apparatus, it should be kept in mind that no attempt is made in our subject invention to control the operation of the heating or cooling generators or plants for the system. Basically the plant whether heating or cooling supplies a source of temperature changing medium which is available in a main line from which the respective zone control valves meter or allow or control a flow to the respective zones. Each of the separate zones as disclosed herein is employing a two-position Weatherstat type of system or a temperature control of the two-position type in which the position of the thermal element will operate the valve or associated controller to one extreme position and upon a cessation of a demand for controlling operation the thermostat element will operate to the other extreme opening the controller or valve. As indicated above a more complete and detailed disclosure of this arrangement will be found in the above named Shivers patent. The control panel for the individual zone apparatus is shown herein only schematically in connection with one of the zones employing a single relay having associated therewith a holding contact, a two-position switch in which the associated motor for the controller is operated to one direction or the other and in addition an auxiliary contact which is opened when the relay is energized to open a shunt across a resistance in the supervisory bridge control 20.

Assuming the use of this apparatus in connection with a heating plant such as a boiler supplying steam or hot water to a multiple zone arrangement through a main piping system and assuming all zones are satisfied, the supervisory network will be in a balanced condition with all of the respective switches open and all of the resistance increments 31—36 included in the network with the potentiometer wiper 23 of the motor balance potentiometer 21 being positioned to provide a null output from the bridge. It should be kept in mind also that the sequencing control or step controllers 105 and 106 will be continuously energized due to the deenergization of the relays 100 and 101 and consequently their associated switches will be cycling through a predetermined sequence, the momentarily open switches 120, 121, etc. being opened periodically for every revolution of the step controller and the normally closed switches 150, 151 being similarly momentarily closed in a predetermined sequence. However inasmuch as the respective zones are not calling for operation, the switching sequence of the step controllers will not effect the operation of the associated zone controls.

Assuming now a condition of a drop in ambient temperature or outdoor temperature which is reflected to the various zones by a decrease in internal temperature indicating a demand for operation of the zone valves to permit the flow of the heating medium through the zone valves to the respective zones. Whenever a respective temperature controller, such as controller 14, is calling for operation by closure of both its pairs of contacts 131, 132 and 133, 134, and the associated step controller 106 is in a position to close the respective switch 151, the relay will be energized and its associated valve 12 operated to an open position. With the operation of the relay which controls the energization of the valve, the relay contact 66 will be opened inserting the resistance 36 in the bridge circuit and unbalancing the same. This unbalance will be present across the wiper 23 and ground connection 42 impressed on the potential divider 75 and on the amplifier 80 to energize the same. At the same time it will also be impressed on the voltage divider 90 and on the amplifier 95 but the extremely small unbalance created by one or several of the zones will not be sufficient to operate the second amplifier 95. However the amplifier 80 will be energized to cause operation or energization of the motor 82 and operation of the balancing potentiometer wiper 23 to move in a direction to balance the bridge. As indicated above, the motor 82 is of a constant speed type regardless of the unbalance present from the bridge output of the network 20 and consequently it will rotate at a predetermined speed in the balancing operation. If only two zones are operated in the sequence, the motor 82 will operate to balance the same without operation of amplifier 95 to deenergize the step controller associated therewith. As indicated above, the length of time required for the motor balance potentiometer to move from one end of the potentiometer winding to the other extremity is relatively long compared to the operation of the step controllers and is governed by the desired limitation on the rate to be placed on the loading of the system. For example in one application we have found that with a number of zones in the vicinity of 40 and with a predetermined power generator or plant, the motor balance potentiometer of the supervisory control was required to move from one extremity to the other at a rate of approximately two hours for the 40 zones to remain within the desired rate of loading. In the same installation the step controllers or sequencing devices operated at the rate of one revolution per minute permitting operation of any of the zones within a single minute.

In the event that the number of zones per unit time calling for heat becomes too great and consequently the operation of the respective zones begins to place an undue load on the heating plant, the unbalance of the bridge created by opening of the contacts 61—66 for the respective zones will produce a large output from the bridge network which will energize not only amplifier 80 but also amplifier 95. The unbalance of the bridge network by the insertion of the number of resistor elements reflecting the load of the individual zones, will be of a predetermined phase to energize the amplifier 95 which is also phase sensitive and causes the operation of one or the other of the relays 97, 98 or in this particular sense the relay 97 which will energize the relay coil 101 in a circuit from the source of power through the relay contacts 97 to coil 101 and back to the opposite side of the source of power indicated at C. The energization of this relay will open the circuit contacts 103 for the step controller 106 deenergizing the step controller and stopping the momentary making of the contacts 150, 151 at that particular point. Thus, as it was indicated above there would be no further opportunity for any of the zones to operate in the closing direction. At the same time, the amplifiers 80 and 95 would remain energized and the motor 82 would operate at a predetermined rate to balance the network. This operation would continue until such time as the wiper 23 reached a point on the winding 22 at which point the output of the bridge network would be at a level where the amplifier 95 would be deenergized and relay contacts on the coil 97 opened. At this point the step controller 106 would be reenergized and the sequence of operation continued for the zones until the unbalance again became too great at which point the operation described above would repeat itself. Assuming that no further zones were calling for heat, the motor 82 would operate to balance the bridge in a conventional manner. The same sequence of operation holds true when a number or all of the zones are operated and a satisfaction of condition begins to exist in the individual zones calling for closure of the zone valves. In a closing direction, the relays for the respective zone controllers will operate to shunt out the resistors for the respective zones unbalancing the bridge in the opposite direction and energizing the amplifier 80 and also the amplifier 95 should the unbalance become too great. Energization of the amplifier 95 would operate the relay 98 and the relay 199 associated therewith to deenergize the step controller 105 which permits the closing of the valves.

As indicated above the capacitive balance potentiometer 67 included in the network 20 is designed for initial adjustment only to balance the bridge due to the inherent capacity of lead lines associated with the network. Once balanced, this capacitance in the bridge does not affect the normal operation of the device. Similarly the ratio or sensitivity adjusting potentiometer 41 adjusts the level of energization of the bridge from the potentiometer source and the balance between the component parts of the bridge. The ratio of the energization between the normal balancing potentiometer and its associated amplifier and motor and the potentiometer 90 associated with the amplifier 95 which controls the operation of the step controllers may be adjusted for any desired level of energization, consequently adjusting the rate at which the supervisory control would come into action to limit loading or unloading of the power plant or generator associated with the equipment.

It should be kept in mind that the present disclosure is intended to be illustrative only and that our invention should be limited only by the scope of the appended claims.

We claim as our invention:

1. A multi-zone control apparatus comprising, a plurality of temperature controlling devices each controlling the flow of an air conditioning media from the central source to a zone to be air conditioned, a plurality of temperature responsive means sensing respectively the temperature of said zones and controlling the operation of said temperature controlling devices associated with the respective zones, a plurality of resistance elements each associated with one of said temperature controlling devices for a zone, a bridge type network including a balancing controller, said plurality of resistance elements and a source of power, means connected in shunting relationship to each of said plurality of resistance elements and controlled respectively by the temperature controlling devices for the respective zones to insert or remove said resistance elements from said bridge network, output circuit means connected to said bridge network, a first motor connected in said output circuit and controllably energized from the output of said bridge network, means connecting said motor means to said balancing controller to operate the same to balance said bridge, said motor operating at a fixed speed, a second output circuit including a dropping resistor and relay means adapted to be operated when the output of said bridge network exceeds a predetermined value, a pair of continuously operating step controller means each having a switch connected respectively in controlling relationship to said temperature responsive means for the zones such that the respective switches of the step controller must be in an operative condition in addition to the operation of said temperature responsive means before the controlling device for a zone may be operated to permit or prevent the flow of air conditioning media to the respective zones, and means connecting the relay means at said second output circuit to the step controllers to stop one or the other of said step controllers depending upon the direction and amount of unbalance of said bridge network.

2. A multi-zone control apparatus comprising, a plurality of temperature controlling devices each controlling the flow of an air conditioning media from the central source to a zone to be air conditioned, a plurality of temperature responsive means sensing respectively the temperature of said zone and controlling the operation of said temperature controlling devices associated with the respective zones, a plurality of resistance elements each associated with one of said temperature controlling devices for a zone, a bridge type network including a balancing controller, said plurality of resistance element and a source of power, means connected in shunting relationship to each of said plurality of resistance elements and controlled respectively by the temperature controlling devices for the respective zones to insert or remove said resistance elements from said bridge network, output circuit means connected to said bridge network, a first motor connected in said output circuit and controllably energized from the output of said bridge network, means connecting said motor means to said balancing controller to operate the same to balance said bridge, said motor operating at a fixed speed, a second output circuit including a dropping resistor and relay means adapted to be operated when the output of said bridge network exceeds a predetermined value, sequencing means connected to each of said temperature responsive means and permitting operation of said temperature controlling devices associated therewith to either allow or prevent the flow of temperature changing media to the respective zones only in a predetermined sequence, and means connecting the relay means of the second output circuit to said sequencing means to prevent sequential operation of the temperature controlling devices depending upon the direction and amount of unbalance of the bridge network.

3. A multi-zone control apparatus comprising, a plurality of temperature controlling devices each controlling the flow of an air conditioning media from the central source to a zone to be air conditioned, a plurality of temperature responsive means sensing respectively the temperature of said zone and controlling the operation of said temperature controlling devices associated with the respective zones, a plurality of resistance elements each associated with one of said temperature controlling devices for a zone, a bridge type network including a balancing controller, said plurality of resistance element and a source of power, means connected in shunting relationship to each of said plurality of resistance elements and controlled respectively by the temperature controlling devices for the respective zones to insert or remove said resistance elements from said bridge network, output circuit means connected to said bridge network, a first motor connected in said output circuit and controllably energized from the output of said bridge network, means connecting said motor means to said balancing controller to operate the same to balance said bridge, said motor operating at a fixed speed when energized by said first named output circuit to balance the bridge at a predetermined rate, a second output circuit including relay means adapted to be operated whenever the output of said bridge circuit exceeds a predetermined rate by failure of the balancing controller to balance the bridge upon an unbalance created by the operation of the temperature control devices, the second output circuit including relay means is adapted to be operated when the output of the bridge network exceeds a predetermined rate, sequencing means connected to each of said temperature responsive means and permitting operation of said temperature controlling devices associated therewith to either allow or prevent the flow of temperature changing media to the respective zones only in a predetermined sequence, and means connecting the relay means to said sequencing means to terminate operation of said sequencing means whenever the rate of operation of said temperature controlling device becomes excessive.

4. In a multi-zone control apparatus comprising, a plurality of temperature controlling means each controlling the flow of the temperature changing medium to a zone with which it is associated, temperature responsive means for each zone reflecting respectively the temperature of said zone and operative upon an indication of a need for operation of said zone to control the associated temperature controlling means, a supervisory controlling network including means responsive to a condition of operation for each zone and a timed balancing means for determining the rate at which the zone temperature controlling means for the zones are operated to either permit or prevent the flow of temperature changing medium to its respective zone, and means operative whenever the rate at which the temperature controlling means are operated exceeds a predetermined value to reduce the rate of operation of said temperature controlling means.

5. In a multi-zone control apparatus comprising, a plurality of temperature controlling means each controlling the flow of the temperature changing media to a zone with which it is associated, temperature responsive means for each zone reflecting respectively the temperature of said zone and operative upon an indication of a need for operation of said zone to control the associated temperature controlling means, a supervisory controlling network including means responsive to a condition of operation for each zone and a timed balancing means for determining the rate at which the temperature controlling means for the zones are operated to either permit or prevent the flow of temperature changing media to its respective zone, sequencing means connected to each of said temperature controlling means and permitting operation of said temperature controlling means for said zones only in a predetermined sequence to allow or prevent the flow of temperature changing media to the respective zones, and means operative whenever the rate at which the temperature controlling means are operated exceeds a predetermined value to reduce the rate of operation of said temperature controlling means.

6. In a multi-zone control apparatus comprising, a plurality of temperature controlling means each controlling the flow of the temperature changing media to a zone with which it is associated, temperature responsive means for each zone reflecting respectively the temperature of said zone and operative upon an indication of a need for operation of said zone to control the associated temperature controlling means, a supervisory controlling network including means responsive to a condition of operation for each zone and a timed balancing means for determining rate at which the temperature controlling means for the zones are operated to either permit or prevent the flow of temperature changing media to its respective zone, sequencing means connected to each of said temperature controlling means and permitting operation of said temperature controlling means for said zones only in a predetermined sequence to allow or prevent the flow of temperature changing media to the respective zones, and means operative whenever the rate at which the temperature controlling means for the zones are operated exceeds a predetermined value for stopping said sequencing means.

7. A multi-zone control apparatus comprising, a plurality of zone controlling means each controlling a flow of a temperature changing medium to a zone with which it is associated, temperature responsive means for each zone operative upon an indication of a need for operation of said zone controlling means to control the operation of said zone controlling means, supervisory control including means reflecting the number of zones receiving temperature controlling media and timed means for establishing a reference as to the rate at which the zones may be connected to or removed from connection with the source of temperature controlling media, circuit means for determining whether zones are connected to or disconnected from the source at too excessive a rate, and means connected to said circuit means and operated in response to an indication of excessive rate of connection or disconnection of said zones from said source to alter the rate of said connection or disconnection.

8. A multi-zone control apparatus comprising, a plurality of zone controlling means each controlling a flow of a temperature changing media to a zone with which it is associated, temperature responsive means for each zone operative upon an indication of a need for operation of said zone controlling means to control the operation of said zone controlling means, supervisory control including means reflecting the number of zones receiving temperature controlling media and timed means for establishing a reference as to the rate at which the zones may be connected to the source of temperature controlling media, circuit means for determining whether zones are connected to said source at too excessive a rate, and means connected to said circuit means and operated in response to an indication of excessive rate of connection of said zones to said source to alter the rate of said connection to said source.

9. A multi-zone control apparatus comprising, a plurality of zone controlling means each controlling a flow of a temperature changing media to a zone with which it is associated, temperature responsive means for each zone operative upon an indication of a need for operation of said zone controlling means to control the operation of said zone controlling means, supervisory control including means reflecting the number of zones receiving temperature controlling media and timed means for establishing a reference as to the rate at which the zones may be connected to or removed from connection with the source of temperature controlling media, circuit means for determining whether zones are connected to or disconnected from the source at too excessive a rate, means for permitting said zone controllers to respond to a call for operation by said temperature responsive means in a predetermined sequence, and means connected to said circuit means and operated in response to an indication of excessive rate of connection or disconnection of said zones from said source to alter the rate of said connection or disconnection.

10. A multi-zone control apparatus comprising, a plurality of zone controlling means each controlling a flow of a temperature changing media to a zone with which it is associated, temperature responsive means for each zone operative upon an indication of a need for operation of said zone controlling means to control the operation of said zone controlling means, supervisory control including means reflecting the number of zones receiving temperature controlling media and timed means for establishing a reference as to the rate at which the zones may be connected to or removed from connection with the source of temperature controlling media, circuit means for determining whether zones are connected to or disconnected from the source at too excessive a rate, means for permitting said zone controllers to respond to a call for operation by said temperature responsive means in a predetermined sequence, and means for stopping said last named means to prevent operation of said zone controllers whenever the rate of operation of said zone controllers becomes excessive.

References Cited in the file of this patent
UNITED STATES PATENTS

| | | |
|---|---|---|
| 2,157,817 | Crago | May 9, 1939 |
| 2,216,825 | Miller | Oct. 8, 1940 |